3,181,060
TESTER FOR ELECTRICAL POWER TOOLS AND THE LIKE HAVING A THREE CONTACT PLUG AND THREE CONTACT SOCKET
Walter C. Hull, 42 Neuman Parkway, Kenmore 23, N.Y.
Filed July 6, 1962, Ser. No. 207,905
1 Claim. (Cl. 324—51)

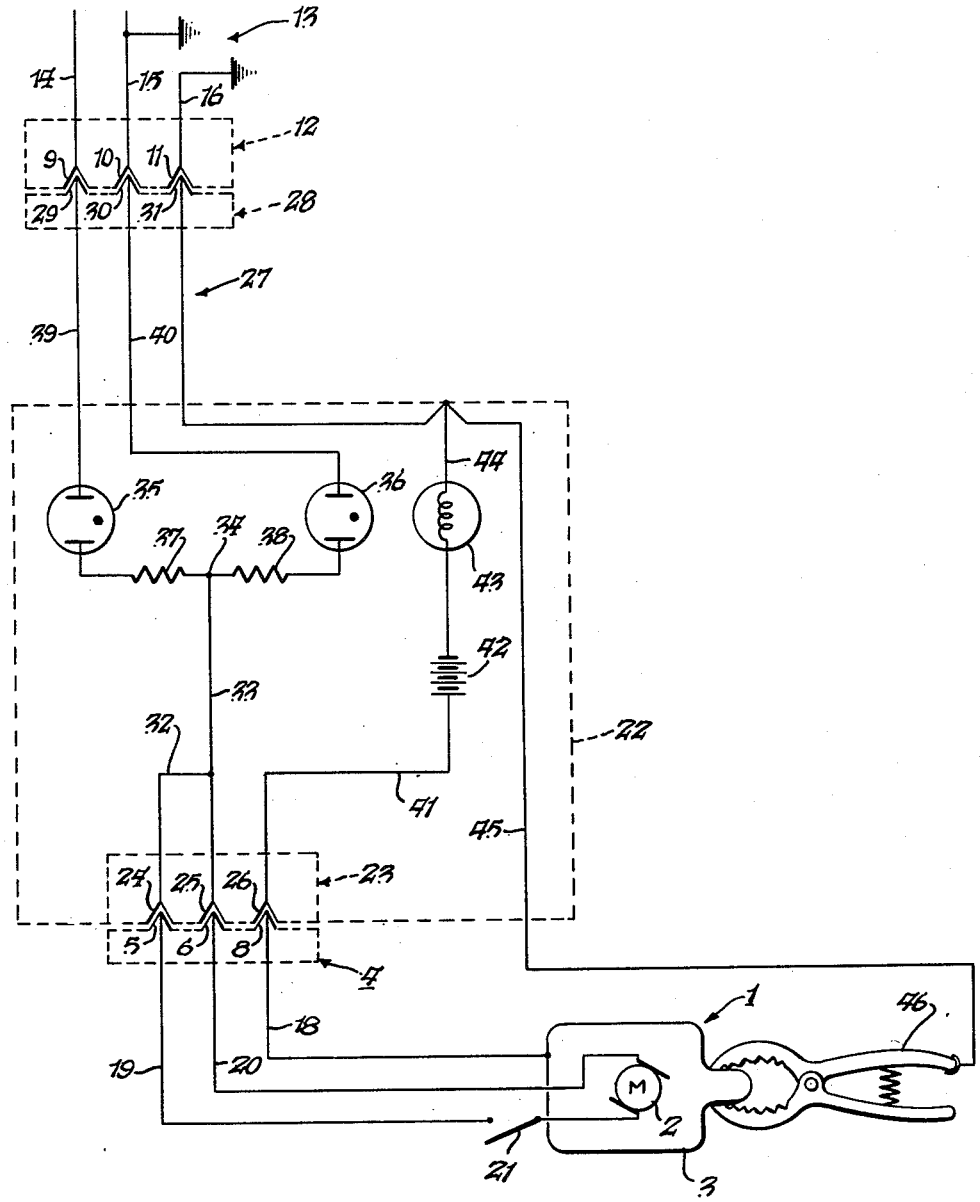

This invention relates to a tester for the safety of portable electrical tools to test both with regard to possible electrical shock to the user because of a short or partial short from the electrical components of the tool to its metal frame or case and also to test that the usual third ground safety wire is both intact and electrically connected to the case. The tester is not related to the operational performance of the tool.

Manufacturing and public utility companies, as well as tool rental agencies, distribute and take back a large quantity of portable electrical tools, such as portable electric drills, saws, etc., which are likely to be used on damp ground and where a short to the case or a break in the usual protective third ground wire to the case could result in serious shock to the user.

The essential object of the present invention is to provide a simple test to ascertain the safety of these tools in these regards so as to be sure that these tools are in a safe useable condition when issued from the crib without establishing an elaborate system of file cards or other records.

To accomplish this end, an important object is to provide a tester which is simple to operate so that with a few simple instructions anyone assigned to the tool crib can perform the test. This person need not have any technical training or special skill and requires only average intelligence.

Another object is to provide a tester which is small, low in cost, durable and simple to maintain.

Another aim is to provide such a tester which can be readily used to test each tool each time it is issued from the crib, and which will test partial shorts, such frequent testing, by the law of averages, serving to eliminate hazardous tools from the crib.

Another object is to provide such a tester by which the test is easy and quick to perform.

Another aim is to indicate a defective tool but not the nature of the defect so that untrained personnel are not tempted to undertake repairs but turn the defective tool over to trained personnel in the electrical department for proper repair.

Another object is to provide such a tester which will also ascertain whether or not there is a break in the usual protective third wire ground or in its connection to the tool's socket contacts or the tool case or frame.

Another object is to provide such a tester which will be fully operative regardless of which contact of the socket of the power supply line is hot and which is not.

Another object is to prevent accidental shock to the tester in testing a defective tool, this being accomplished by limiting resistors which prevent the current from rising above a safe value.

Other objects and advantages of the invention will be apparent from the following description and drawing which is a diagrammatic representation of a tester embodying the invention applied to a tool to be tested and to a 110 volt, 60 cycle lighting circuit.

The tool 1 to be tested is assumed to have an electric motor 2 within a metal case or frame 3 and has a plug 4 with three metal contact prongs 5, 6 and 8 which in use are connected with the socket contacts 9, 10 and 11 of the socket 12 of a 110 volt, 60 cycle power line 13. The two sides of this power line are indicated at 14 and 15, the side 14 being connected with the socket contact 9 and the side 15 being connected with the socket contact 10 and being grounded, and a third grounded wire 16 connects with the socket contact 11, this being to insure that the case 3 of the tool will be grounded regardless of which side 14 or 15 of the main power line is hot or grounded. To this end the prong 8 of the plug 4 which connects electrically with the third ground wire 16 is connected to a wire 18 in the tool plug 4 which terminates in the metal case 3 of the tool. The other two wires 19 and 20 of the tool plug 4 connect with opposite sides of the electric motor 2 and connect with the prong contacts 5 and 6 of the tool plug 4. The usual manual switch 21 for operation of the tool is shown as being included in the line 19.

The principal parts of the tester are contained in a case 22 having a socket 23 with socket contacts 24, 25, 26 in one side which receives the three contact plug 4 of the tool being tested. The contact 26 mates with the prong 8 and the contacts 24 and 25 mate respectively with the prongs 5 and 6. The tester also has a supply line 27 terminating in a plug 28 having prong contacts 29, 30 and 31. The prong 31 mates with the grounded third wire socket contact 11 of the socket 12 and the prongs 29 and 30 mate respectively with the main line socket contacts 9 and 10. The socket contacts 24 and 25 have connected lines 32, 33 which jointly connect with a center tap 34 between two neon glow lamps 35, 36 each having the conventional resistance (not shown) in its base plus external current limiting series resistors 37 and 38. The other side of the neon lamp 35 is connected by a line 39 with the prong contact 29 of the plug 28 and the other side of the neon lamp 36 is connected by a line 40 with the prong contact 30.

The socket contact 26 of the socket 22 is connected by a line 41 with a battery 42 in series with an incandescent flash light bulb 43 the other side of which is connected by line 44 with a line 45. This grounds the case 22 and connects with the prong contact 31 of the plug 28. The other end of this line 45 connects to a clip or tong type tool 46 which can be attached to the metal case 3 of the tool 1 being tested.

In the use of the tester, its three prong contact plug 28 is plugged into the power line socket 12 and in so doing the third ground wire contacts 11 and 31 mate to ground the line 44 in the tester. The prong contacts 29 and 30 mate respectively with the socket contacts 9 and 10 of the sides 14 and 15 of the main power line either of which can be hot, it being assumed that the side 15 is grounded. The three prong contact plug 4 of the tool 1 to be tested is then plugged into the socket 23 of the tester, its prong contacts 5, 6 and 8 mating, respectively, with the socket contacts 24, 25 and 26. The alligator clip or tong type connector 46 is then attached to a part of the metal frame or case of the tool and the tool switch 21 is closed.

If at this time all three lights 35, 36 and 43 are illuminated, the tool 1 is free from any substantial short between its electrical components 2, 19, 20 and its metal case 3 and the safety ground wire 18 of the tool is intact and connects the metal case 3 with the contact 8.

Thus if no substantial short exists between the metal case 3 of the tool and any electrical component and hence either side of the cord of the tool, both neon lights 35 or 36 are illuminated to signal level. Thus, with the tool 1 free from shorts, the circuit is from the side 14 of the outside power line 13, contacts 9 and 29 of the socket 12 and plug 28, respectively, line 39, gas filled glow lamp 35, resistors 37, 38, gas filled glow lamp 36, line 40, and contacts 30 and 10 of the plug 28 and socket 12 to the grounded side 15 of the main power line. If, however, such a short does exist, say between the case 3 and the side 19 of the tool cord supply line, the neon light 36 will fail to light up and the tool will not be issued from the crib but will be withdrawn from service as a defective tool and sent to the electrical maintenance department for repair or replacement. The circuit preventing the neon light 36 from lighting up comprises the hot side 14 of the main power line, contacts 9 and 29 of the socket 12 and plug 28, respectively, line 39, neon glow lamp 35, resistor 37, lines 33 and 32, contacts 24 and 5 of the socket 23 and plug 4, respectively, side 19 and closed switch 21 shorted to the metal case 3, clip or tong type connector 46, and line 45, contacts 31 and 11 of the plug 28 and socket 12, respectively, to the grounded wire 16. The conventional base resistor (not shown), plus the internal gas resistance of the neon lamp, prevents current flow of signal value through the lamp 36 at this time.

It will be seen that this same neon light 35 will be illuminated and the lamp 36 prevented from lighting up if the short is between the metal case or frame 3 of the tool 1 to the side 18 of the tool cord, the circuit then being from the line 33, contacts 25 and 26 of the socket 23 and plug 4, respectively, and through the side 18 shorted to the tool case or frame 3. It will also be seen that if the side 15 of the main power line should be at its hot side with its side 14 grounded, the neon light 36 would be illuminated instead of the neon light 35 which would fail to light in the event of a short from the electrical components of the tool 1 to its case 3.

The resistors 37, 38 are important in the event of a short circuit at their 110 volt neon glow lamps 35, 36, respectively. To protect the person doing the testing in such event, a value of 220,000 ohms for each resistor has been found satisfactory. Higher resistance than this was found to render both neon lamps inoperative as a glow signal of the satisfactory condition of the tool while this value, as a current limiting resistor, was adequate to protect the person testing in the event of a short at the neon lamp. Thus at 120 volts, a resistance of 220,000 ohms will permit only .00054 ampere to flow which is far below any amount ever found harmful to humans.

Portable tools are now equipped with a three wire cord and connecting plug 4, the third wire 18 being the ground wire connected to the frame or case to conduct away any stray current from the user. This function ceases, of course, if there should be a break in this ground wire 18 or its connection to the case or frame 3. If this third wire 18 is intact and properly connected to the case or frame, the flash light lamp 43 goes on. Thus a circuit is established from battery 42 through line 41, contacts 26 and 8 of the socket 23 and plug 4, respectively wire 18, case or frame 3 clip or tong type connector 46, and lines 45 and 44 to the other side of the battery.

Thus by attaching the clip or tong type ground connector to the tool case or frame 3 and closing the switch 21, that if the both neon lamps 35 and 36 are illuminated and if the flash light bulb 43 is also illuminated, the employee checking out tools at the crib knows that the tool is safe to use and both free from short to the frame 3 and also that the protective third ground wire 18 of the tool is both intact and connected with this frame. If either neon light 35 or 36 fails to glow when the tester is being used he knows there is a dangerous short from the electrical compounds of the tool 1 to its metal case or frame 3. The tester, with but one glow lamp, could be used but one could not be certain that the lamp would not fail. The reason two are used in a balanced circuit is to provide a continuous indication whenever the tester is energized and both glow lamps have equal intensity that both the tool and the tester are in good order. If but one glow lamp were used one would not have constant proof that the tester is in good order. By using two glow lamps and with both glowing at equal brilliancy at all times when the tester is energized, as soon as the tool 46 is plugged in for test, if any change occurs one is sure that the tool under test is the reason and not the tester or its supply circuit. This balanced circuit is in reality a self testing circuit for the tester and assures the operator of a reliable result.

If at this time there should be a short at either neon lamp 35 or 36, the person doing the testing is protected against shock, as in applying the grounded clip 46 to the tool case 3, by the 220,000 ohm limiting resistors 37, 38. If at this time the flash light bulb 43 does not go on, the tester knows that there is a break in the safety third ground wire 18 or its connection with the case or prong contact 8.

It will accordingly be seen that the present invention provides a simple and reliable tester against shorts to the frames or cases of portable tools as well as to the operativeness of its third safety ground wire and accomplishes the various objects set forth.

I claim:

A tester for electrical power tools and the like having a metal case and electrical operating components including a tool plug with a first, second and third contact to be connected respectively with a first, second and third contact of a current supply socket, said first contact of said tool plug being connected to said case and said first contact of said current supply socket mating therewith being grounded; comprising a tester circuit plug having a first, second and third contact adapted to plug into said current supply socket with its first, second and third contacts mating respectively with said first, second and third contacts of said current supply socket, a three contact tester circuit socket having a first, second and third contact mating respectively with said first, second and third contacts of said tool plug, a metal clip adapted to be connected to said metal case, a ground line connecting said clip with said first contact of said tester circuit plug to ground said case, a line electrically connecting the second and third contacts of said tester circuit socket, a signal device respectively in series with each of said second and third contacts of said tester circuit plug and also in series with said line electrically connecting said second and third contacts of said tester circuit socket whereby in the event of a short circuit between said case and said electrical components of said tool, one of said signal devices will not be actuated, a low voltage source of power and a low voltage signal device in series with each other across said first contact of said tester circuit plug and said first contact of said tester circuit socket whereby in the event of a break in the ground connection between said first contact of said tool plug and the said case, said low voltage signal device will not be operated.

References Cited by the Examiner
UNITED STATES PATENTS

| | | | |
|---|---|---|---|
| 2,442,771 | 6/48 | Kirkpatrick | 324—51 |
| 2,806,993 | 9/57 | Matousek | 324—51 |
| 2,994,819 | 8/61 | Vincent | 324—51 |

WALTER L. CARLSON, *Primary Examiner.*

FREDERICK M. STRADER, *Examiner.*